Dec. 1, 1970   J. DE KONING ET AL   3,543,565
METHOD AND APPARATUS FOR DETERMINING THE CONCENTRATION OF
DREDGER SPOIL IN A SUSPENSION OF DREDGER SPOIL AND WATER
FLOWING THROUGH A PIPE
Filed March 28, 1968

INVENTORS
JAN DE KONING
ROMKE VAN DER VEEN
BY
ATTORNEYS

United States Patent Office 3,543,565
Patented Dec. 1, 1970

3,543,565
METHOD AND APPARATUS FOR DETERMINING THE CONCENTRATION OF DREDGER SPOIL IN A SUSPENSION OF DREDGER SPOIL AND WATER FLOWING THROUGH A PIPE
Jan de Koning, Amsterdam, and Romke van der Veen, Jutphaas, Netherlands, assignors to N.V. Ingenieursbureau voor Systemen en Octrooien, Spanstaal, Rotterdam, Netherlands, a Dutch contracting company
Filed Mar. 28, 1968, Ser. No. 716,809
Claims priority, application Netherlands, Mar. 31, 1967, 6704596
Int. Cl. G01n 15/06, 9/26
U.S. Cl. 73—61    9 Claims

ABSTRACT OF THE DISCLOSURE

For determining the concentration of dredger spoil in a suspension of dredger spoil and water flowing through a horizontal pipe, the difference is measured between the pressures at two different levels at least of the horizontal pipe and the concentration is derived from this pressure difference.

---

This invention relates to a method and apparatus for determining the concentration of dredger spoil in a suspension of dredger spoil and water flowing through a pipe.

It is known and it is generally conventional to measure the concentration of dredger spoil in a horizontal pipe by means of gamma rays. The equipment required for this purpose is very expensive. The invention provides a method and a suitable apparatus which is much cheaper, the difference between the pressures being measured at two different levels of the horizontal pipe at least and the concentration being derived from this pressure difference. The concentration determined in this way is a valuable item of information to the dredging operator in so controlling the concentration as to pump a suspension with the maximum possible spoil concentration through the pipe without any risk of the latter's silting up.

Calibrations have shown that the pressure difference measured between the top and bottom of the horizontal pipe is not only an indication of the concentration but that it is also substantially proportional to the mean concentration, although the speeds of the suspension at the top and bottom of the horizontal pipe are not equal and the concentration varies throughout the flow cross-section.

The following equation can be propounded in this connection:

$$H/D = 1 - C_r + C_r \cdot S_b$$

In this equation:

H is the measured pressure difference between the top and bottom of the pipe,
D is the height of the pipe,
$C_r$ is the mean volumetric concentration of a dredger spoil in the suspension and
$S_b$ is the known specific gravity of the dredger spoil without any cavities, being equal to 2.65 kg. per cu. dm.

From this equation it follows that $1.65\, C_r = H/D - 1$.

It is known that in a horizontal pipe the conveyed concentration $C_t$, which is the concentration of dredger spoil in the suspension conveyed through a pipe, is equal to 0.65 times the volumetric concentration $C_r$ of dredger spoil in the suspension flow through this pipe. Hence:

$$C_t = 0.4\, (H/D - 1)$$

The weight of conveyed dredger spoil per cubic dm. of flowing suspension, denoted by $G_b$, is equal to $2.65 \cdot C_t$.

The weight E of dredger spoil flowing through the pipe per unit of time is equal to $G_b \cdot v \cdot A$, where $v$ denotes the suspension speed and A the area of the flow cross-section.

The above and other features of the invention will be explained in the following description of a number of devices according to the invention. In the diagrammatic drawings.

Figure 1:
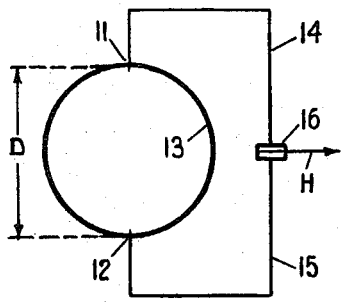
FIG. 1 is a cross-section through a horizontal pipe with a measuring device according to the invention.

FIG. 1 shows the measuring station 11 at the top and the measuring station 12 at the bottom of a horizontal pipe 13. The measuring lines 14 and 15 are connected at one end to the inside of pipe 13 and at the other end to a pressure pick-up 16. The latter measures the pressure difference H between the pressures at the measuring stations 11 and 12.

The conveyed concentration of dredger spoil in the suspension can be reliably derived from the measured value H provided that there is no spoil deposited at the bottom of pipe 13.

Figure 2:
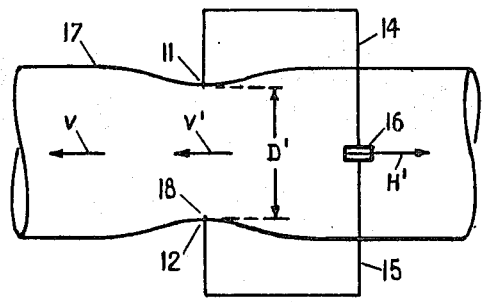
FIG. 2 is a longitudinal section through the measuring zone of another horizontal pipe with a measuring device according to the invention.

A very reliable measurement is obtained if the pressure difference H' is measured as shown in FIG. 2, in which pipe 17 has a local constriction 18 to ensure that no spoil is deposited at said constriction. The conveyed concentration $C_t$ is then equal to $$0.65 - C_r = (H'/D' - 1) \cdot 0.65/1.65$$

Figure 3:
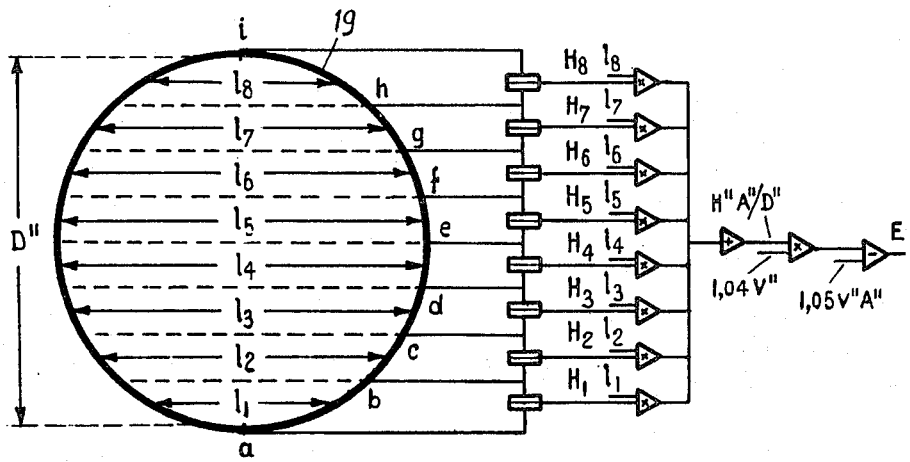
FIG. 3 is a cross-section through a horizontal pipe with another development of a measuring device according to the invention.
Figure 4:
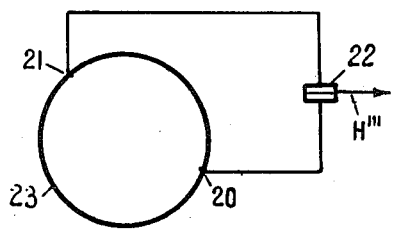
FIG. 4 is a cross-section through a horizontal pipe with the most elementary measuring device according to the invention.

The conveyed concentration $C_t$ varies with the level in the pipe. The width of the round pipe 19 also varies and it is therefore more scientific to measure the concentration for the different layers and take the mean of the measured concentration. In the apparatus shown in FIG. 3 pressure pick-ups are disposed between measuring stations a, b, c, d, e, f, g, h and i, which are each situated at a different height and respectively measure the pressure differences $H_1$, $H_2$, $H_3$, $H_4$, $H_5$, $H_6$, $H_7$, $H_8$. These measured values are respectively multiplied by the associated width of the flow cross-section $l_1$, $l_2$, $l_3$, $l_4$, $l_5$, $l_6$, $l_7$, $l_8$. Addition to these products gives the product $H''/D''$ and the area of the total flow cross-section $A''$. Multiplication of this product by $1.05v''$ gives the term $1.05A'' \cdot v'' \cdot H''/D''$ which after deduction of $1.05A''v''$ gives the yield 0 of dredger spoil per unit of time. Of course measurement of the pressure difference $H'''$ at two arbitrary measuring stations 20 and 21 situated at different levels by means of a pressure pick-up 22 gives an indication of the concentration of dredger spoil in the suspension conveyed through this horizontal pipe 23 (see FIG. 4). Calibration of this system under known operating conditions enables the dredger spoil concentration to be accurately determined for even unknown operating conditions.

What we claim is:

1. A method of determining the concentration of dredger spoil in a suspension of dredger spoil and water, which comprises the steps of:
flowing such suspension in horizontal direction while constricting the cross sectional area of such flow at a predetermined region, and
measuring the difference in pressures between different vertical levels of said suspension in said region of constricted cross section.

2. The method according to claim 1 wherein measurement of said difference in pressures is made at the bottom and top of said region.

3. The method according to claim 1 wherein measurement of said difference in pressures is made at the bottom and top of said region and at least one intermediate level.

4. The method according to claim 3 including the steps of correcting such pressure differences for flow, and averaging the flow-corrected measured pressure differences.

5. A method of determining the concentration of dredger spoil in a suspension of dredger spoil and water, which comprises the steps of:
flowing such suspension in a horizontal direction,
measuring the difference in pressure of such suspension across a first stage between first and second levels of the horizontally flowing suspension,
measuring the difference in pressure of such suspension across a second stage between levels of the horizontally flowing suspension different from said first and second levels,
correcting each measured pressure difference as a function of flow through its associated stage, and
averaging such flow-corrected measurements.

6. Apparatus for determining the concentration of dredger spoil in a suspension of dredger spoil and water, comprising in combination,
a horizontal pipe for conducting a flow of the suspension,
first pressure difference pick-up means for measuring the pressure difference across a first stage defined between different levels of said pipe,
second pressure difference pick-up means for measuring the pressure difference across a second stage defined between levels different from the two levels defining the first stage,
means for correcting each measured pressure difference as a function of flow through the associated stage, and
means for averaging the corrected pressure differences.

7. Apparatus according to claim 6 including means defining a constriction in said pipe, said pick-up means being connected to measure pressure differences within said constriction.

8. Apparatus for determining the concentration of dredger spoil in a suspension of dredger spoil and water, comprising in combination,
a horizontal pipe for conducting a flow of the suspension,
means defining a constriction in said pipe, pressure difference pick-up means for measuring the difference in pressures between different vertical levels of said suspension in said pipe within the constriction thereof.

9. Apparatus according to claim 8 wherein said pick-up means measures the difference in pressure between the top and bottom of the constriction.

References Cited
UNITED STATES PATENTS

| | | | |
|---|---|---|---|
| 2,714,819 | 8/1955 | Clark | 73—212 |
| 2,959,053 | 11/1960 | Klein | 73—438 X |
| 3,130,586 | 4/1964 | Taylor et al. | 73—438 X |
| 3,175,403 | 3/1965 | Nelson | 73—438 |

FOREIGN PATENTS 157,830   9/1963   U.S.S.R.

LOUIS R. PRINCE, Primary Examiner

J. W. ROSKOS, Assistant Examiner

U.S. Cl. X.R.

73—205, 438